US008713100B1

(12) United States Patent
Hamm

(10) Patent No.: US 8,713,100 B1
(45) Date of Patent: Apr. 29, 2014

(54) HYBRID ASYNCHRONOUS TRANSMISSION PROCESS

(71) Applicant: Michael L. Hamm, Villa Park, IL (US)

(72) Inventor: Michael L. Hamm, Villa Park, IL (US)

( * ) Notice: Subject to any disclaimer, the term of this patent is extended or adjusted under 35 U.S.C. 154(b) by 0 days.

(21) Appl. No.: 14/102,752

(22) Filed: Dec. 11, 2013

(51) Int. Cl.
    G06F 15/16 (2006.01)
    G06F 15/173 (2006.01)

(52) U.S. Cl.
    USPC .......................................... 709/203; 709/224

(58) Field of Classification Search
    CPC ................................ G06F 17/30861–17/30899
    USPC .................................................. 709/203, 224
    See application file for complete search history.

(56) References Cited

U.S. PATENT DOCUMENTS

| 6,683,629 | B1 | 1/2004 | Friskel et al. | |
|---|---|---|---|---|
| 7,039,699 | B1 | 5/2006 | Narin et al. | |
| 7,805,670 | B2 | 9/2010 | Lipton et al. | |
| 7,895,296 | B1 | 2/2011 | Dayan | |
| 7,921,353 | B1 | 4/2011 | Murray | |
| 8,028,079 | B2 | 9/2011 | Felon et al. | |
| 8,041,839 | B2 | 10/2011 | Yu et al. | |
| 8,099,518 | B2 | 1/2012 | Dong et al. | |
| 8,122,104 | B2 | 2/2012 | Kordun et al. | |
| 8,335,982 | B1 | 12/2012 | Colton et al. | |
| 8,572,559 | B2 * | 10/2013 | Calvin | 717/108 |
| 2007/0214239 | A1 | 9/2007 | Mechkov et al. | |
| 2008/0120570 | A1 | 5/2008 | Adams et al. | |
| 2009/0006543 | A1 * | 1/2009 | Smit | 709/203 |
| 2009/0210781 | A1 * | 8/2009 | Hagerott et al. | 715/234 |
| 2009/0248850 | A1 * | 10/2009 | Thangadurai et al. | 709/224 |
| 2009/0293018 | A1 | 11/2009 | Wilson et al. | |
| 2011/0066676 | A1 * | 3/2011 | Kleyzit et al. | 709/203 |
| 2011/0066741 | A1 | 3/2011 | Hoefner et al. | |
| 2012/0191840 | A1 | 7/2012 | Gordon | |
| 2012/0311024 | A1 * | 12/2012 | Burckhardt | 709/203 |

FOREIGN PATENT DOCUMENTS

EP 1805583 B1 8/2012

* cited by examiner

Primary Examiner — Jeong S Park
(74) Attorney, Agent, or Firm — Nicholas Pfeifer; Smith & Hopen, P.A.

(57) ABSTRACT

The present invention is a hybrid asynchronous transmission process capable of reducing multiple asynchronous requests and responses to a single asynchronous request or response while reducing the amount of data being transferred. The hybrid transmission process utilizes data store, referred to as a transition state store (TSS), to locally store name/value pairs as strings in the web browser. The TSS stores both the current and future states of the webpage, based on user interaction. The utilization of the API's and data store in the transmission process allow updates to the desktop state without transmitting mass amounts of data between the server and web browser.

20 Claims, 4 Drawing Sheets

HYBRID ASYNCHRONOUS TRANSMISSION PROCESS

BACKGROUND OF THE INVENTION

1. Field of the Invention

This invention relates, generally, to computer processing. More specifically, it relates to a hybrid asynchronous transmission process.

2. Brief Description of the Prior Art

Traditionally interacting with a Web application consisted of a user selecting a link on a web page, the browser flashing and beginning to postback to the server while the user waited for the page to be repainted. Much of the time, the new version of the page was the same as the previous version, with only a small portion being updated. This cycle was constantly repeated when using Web applications and was time consuming for even the fastest of connections.

The first attempt to prevent full webpage repainting was AJAX (Asynchronous JavaScript and XML). AJAX works through the browser and attempts to bring richness to Web applications through interactive workflows stemming from asynchronous communications to servers. The goal is to provide a user with the capabilities to interact with a webpage while the browser is communicating with a server in the background. Asynchronous communications are essential for activities that are potentially blocking, such as when applications access the web. Access to a web resource can be slow or delayed and if an activity is blocked within a synchronous process, the entire application must wait. In an asynchronous process, the application can continue with other work that doesn't depend on the web resource until the potentially blocking task finishes.

The AJAX technologies have changed the user's Web application experience. With the JavaScript code, the browser communicates asynchronously with the Web Server. A request to a server no longer results in the browser flashing and the user being unable to view and interact with the page. JavaScript receives the updated data from the server and modifies the page dynamically, using DHTML coding methodology. AJAX is providing users with a more responsive, desktop like experience.

Asynchrony proves especially valuable for applications that access the UI thread because all UI-related activity usually shares one thread. If any process is blocked in a synchronous application, all are blocked. Your application stops responding, and you might conclude that it has failed when instead it's just waiting. When using asynchronous methods, the application continues to respond to the UI. You can resize or minimize a window, for example, or you can close the application if you don't want to wait for it to finish. A typical asynchronous transmission process for a single asynchronous request can be seen in FIG. 1.

This creates problems of its own due to the stateless protocols including the Internet Protocol (IP) which is the foundation for the Internet, and the Hypertext Transfer Protocol (HTTP) which is the foundation of data communication for the World Wide Web. This fire and forget programming model works in Desktop applications since the application sticks around until the OS kills it, so whenever the asynchronous callback runs there is guaranteed to be a UI thread that it can interact with. In web applications, this model falls apart since requests are by definition transient. If the asynchronous callback happens to run after the request has finished, there is no guarantee that the data structures that the callback needs to interact with are still in a good state. Today's solution is to synchronize the asynchronous processing tasks. This design becomes very complicated quickly, especially if it is to be flexible and change dynamically based on the specific user's request. This solution also leaves us with two serious problems: (1) trips to the server (number of requests) and (2) UpdatePanels cannot be added, removed and added again without running the page. The solution results in a design which is heavy, static, expensive and difficult to program and maintain.

Accordingly, what is needed is a more efficient and effective asynchronous transmission process. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a more efficient and effective client-server transmission process is now met by a new, useful, and nonobvious invention.

In an embodiment, the current invention is a computer-implemented method, or alternatively one or more non-transitory tangible computer-usable media having computer-executable instructions for performing a method by running a software program on a computer. The computer operates under an operating system, and the method includes issuing instructions from the software program to asynchronously communicate between a web browser and server and reducing multiple asynchronous requests and responses to a single asynchronous request and response while also reducing the amount of data being transferred. The transmission process is initiated in response to a user interacting with a webpage via a web browser. In response to the user's interaction a client transition state manager updates a domObject's ready state parameters in a transition state store. The transition state store is a data store accessible by both the server and web browser, and is capable of storing a domObject's open state parameters and the domObject's ready state parameters. The user's interaction may be a webpage request or an update to the domObject's ready state.

After updating the transition state store, the web browser sends a single asynchronous request to a server. Upon receipt of the request, a server transition state manager reads the domObjects' ready state parameters and the domObjects' open state parameters in the transition state store, and performs a set of appropriate tasks based on the read parameters, and creates a response to the request. The server then creates a single asynchronous response to the request and sends the response to the web browser.

The client transition state manager reads the domObjects' ready state parameters and the domObjects' open state parameters in the transition state store and performs appropriate client tasks based on the read parameters. The client transition state manager then updates the domObjects' ready states and domObjects' open states in the transition state store. Finally, the document object model is updated.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

Figure 1:
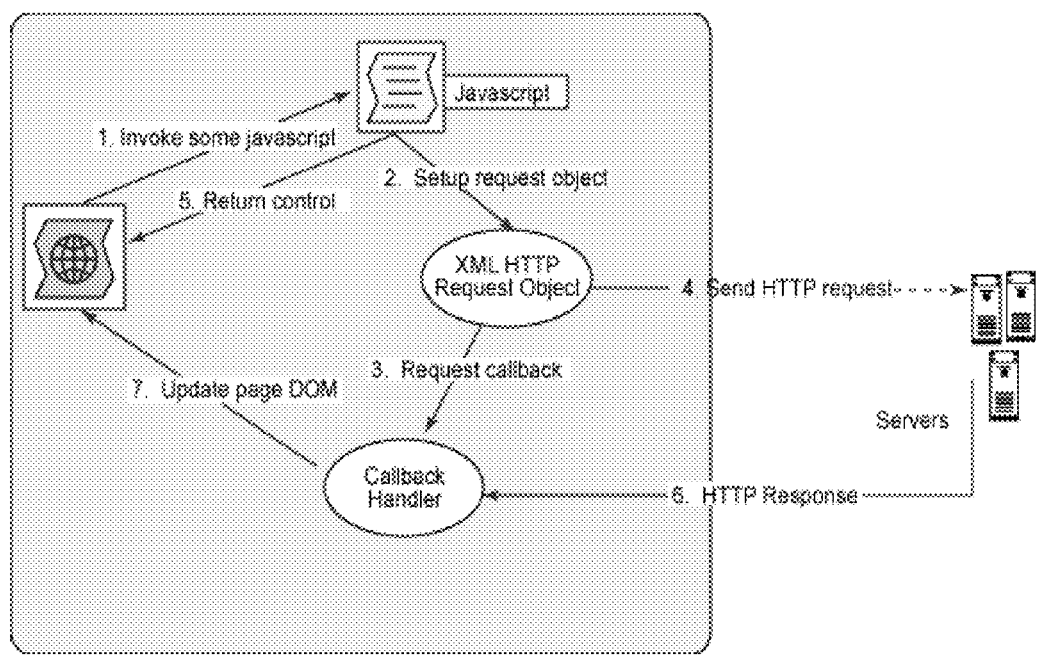
FIG. 1 is a schematic structural diagram of a single asynchronous request as is typical in the current state of the art.
Figure 2:
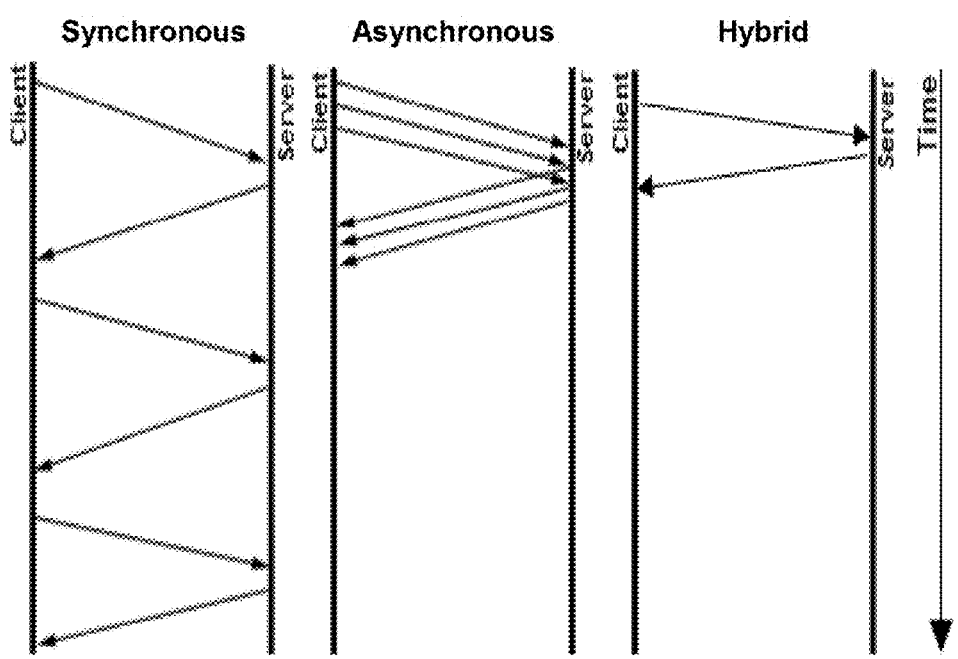
FIG. 2 is a diagram comparing synchronous, asynchronous, and the hybrid transmission processes with respect to time.

The present invention includes a hybrid transmission process for client-server communications—distributed computing that partitions tasks or workloads between the providers (servers), and users (clients). Often clients and servers communicate over a computer network on separate hardware, but both client and server may reside in the same system. The hybrid transmission process reduces multiple asynchronous requests and responses to a single asynchronous response or request while reducing the amount of data being transferred. As shown in FIG. 1, the present invention is much more effective than both the asynchronous and synchronous transmission processes. FIG. 2 further illustrates the single request and single response The present invention utilizes a data store, referred to as a transition state store (TSS), to locally store name/value pairs as strings in the web browser. The TSS changes the name/value pairs to structured data strings and the data strings are accessible by both a server-side application programming interface (API), referred to as a server transition state manager (STSM), and a client-side API, referred to as a client transition state manager (CTSM).

The TSS stores the information on the objects in the document object model (DOM). Objects may be any item, determined by a person having ordinary skill in the art, that can be individually selected and manipulated, including but not limited to a desktop, shortcut, window, menu, taskbar, and context menu. For clarity, the objects in the DOM (domObjects) that are stated above shall be referred to as domDesktop, domShortcut, domWindow, domMenu, domTaskbar and domContextMenu. The TSS stores the information on the domObjects' Open State parameters and domObjects' Ready State parameters. The domObjects' Open States are lists of the domObject Ids that exist in the (DOM) user's web browser while the domObjects' Ready States are lists of the domObject Ids that DO NOT exist in the (DOM) user's web browser.

The TSS is preferably a text relational database redesigned from the standard name/value pairs data store. The TSS data store may be of a form including but not limited to cookies, hidden fields, and two synchronized objects where one is on the client-side and one is on the server-side of the client-server relationship. In a certain embodiment the TSS may be any data store, known to a person having ordinary skill in the art, capable of communicating with both the server-side and client-side of the client-server relationship.

The STSM and CTSM are both designed to ease the work of programming the graphical user interface components and each preferably comes in the form of a library or specification for a set of functions or routines, data structures, and variables that read and write the domObjects' Open States and domObjects' Ready States to or from the TSS.

Figure 3:
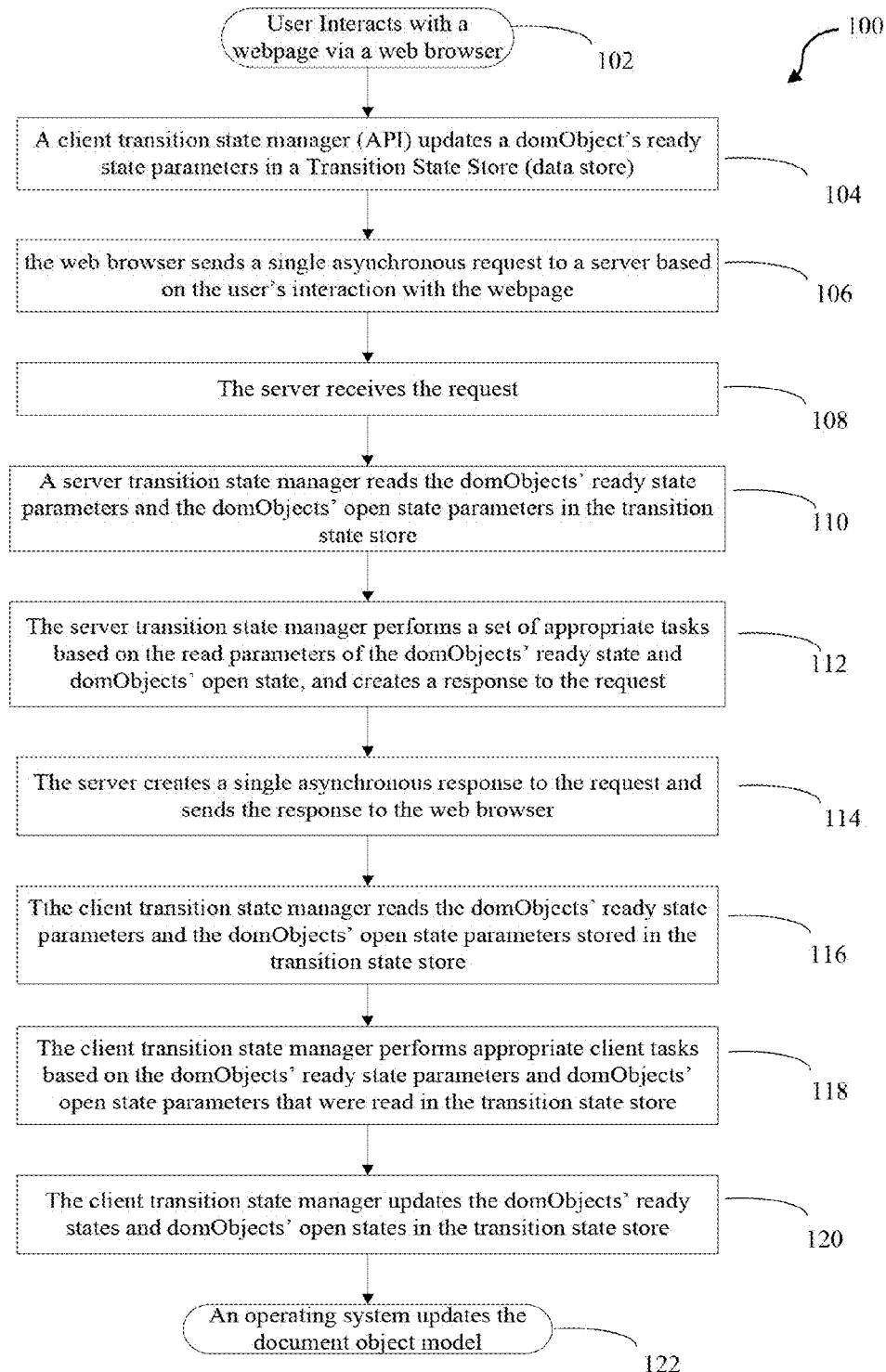
FIG. 3 is a flowchart of the hybrid transmission process.

In a certain embodiment, generally denoted as numeral 100 and shown in FIG. 3, the hybrid transmission process is initiated in step 102 when a user interacts with a webpage via a web browser. The CTSM updates the domObject Ready State parameters in the TSS in step 104. A user interaction includes but is not limited to, requesting a web page via the web browser or updating the ready state of a domObject of a webpage. Prior to the user interaction, the user requests a webpage in a browser for the first time and the CTSM stores the domObjects' Open State parameters in the TSS. Following the user interaction, a request, preferably an HTTP Post Request, is sent to the server in step 106 and the server receives the request in step 108. The server initializes the STSM and in step 110, the STSM reads the domObjects' Open State parameters and domObjects' Ready State parameters stored in the TSS. The STSM then performs a set of appropriate server tasks. See step 112.

Upon completion of the tasks, the server creates and sends a response in step 114, preferably an HTTP Post Response, to the callback handler. The CTSM then reads the TSS, step 116, and performs the necessary client tasks based on the read parameter, step 118. The CTSM updates the domObjects' Open State parameters in the TSS to mirror the new open state of the domObjects that now exist in the DOM and updates the domObject Ready State parameters in the TSS. See step 120. If the user has not yet performed an interaction subsequent to the last interaction, the domObjects' Ready State parameters in the TSS are set to an empty string to clear the domObjects' Ready State parameters in the TSS until the CTSM updates the TSS as a result of another user interaction. Finally, in step 122, an operating system on the user's computer updates the DOM based on the domObjects' Ready State parameters before step 118 or the domObjects' Open State parameters subsequent to step 120.

In a certain embodiment, step 120 may occur subsequent to step 122. In such an embodiment, just after the DOM has been updated, CTSM updates the domObjects' Open State parameters in the TSS to mirror the new open state of the domObjects that now exist in the DOM and updates the domObject Ready State parameters in the TSS. Similarly, if the user has not yet performed an interaction subsequent to the last interaction, the domObjects' Ready State parameters in the TSS are set to an empty string to clear the domObjects' Ready State parameters in the TSS until the CTSM updates the TSS as a result of another user interaction.

In a certain embodiment the request that is sent to the server includes two parameters, an _EVENTTARGET and an _EVENTARGUMENT. The _EVENTTARGET was redefined so that the value of the parameter is always a single updatepanel, referred to as domGate. The _EVENTARGUMENT can be one value "initialize" or up to three individual values in a pipe delimited string. The "Initialize" value tells the STSM to set all domObjects' Open State values to domObjects' Ready States and delete the domObjects' Open States. This tells the server to loop all domObject types to rebuild the domDesktop. For example: "domWindows|welcome" (_EVENTARGUMENT) tells the STSM to read a domWindows database in the TSS domWindows' Open State values to domWindows' Ready States and get the requested resource (a welcome window) and add the object(s) to domGate. If a third individual value is in the string then this transaction is a form PostBack and the third item is the method to run in the form.

EXAMPLE

Figure 4:
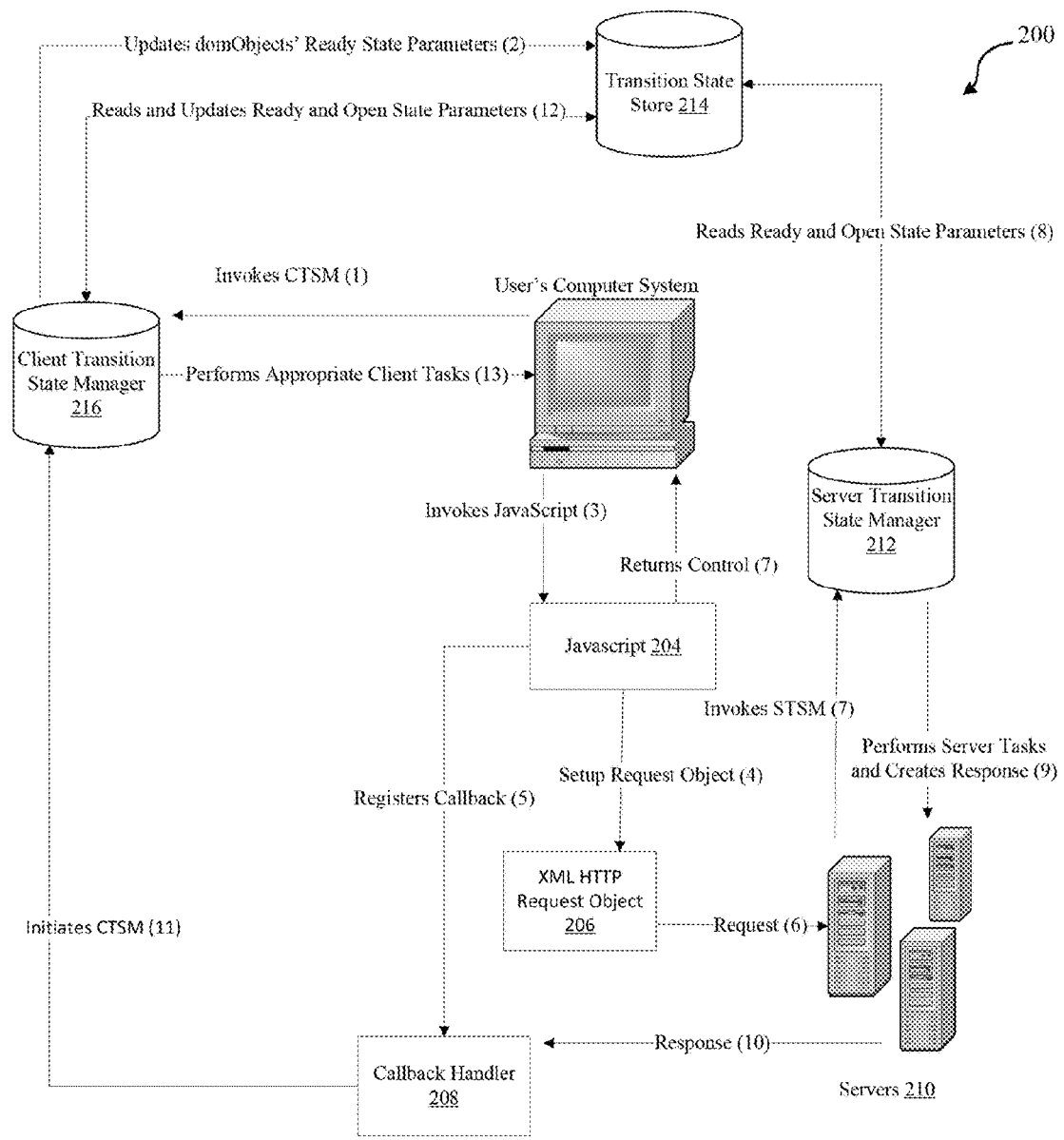
FIG. 4 is a schematic structural diagram of a certain embodiment of the present invention containing numerical indicators to indicate the chronological order of the transmission process.

In a certain embodiment, as shown in FIG. 4 and generally denoted by numeral 200, a user interacts with a webpage containing JavaScript 204 and invokes JavaScript 204. Prior to the user interaction, domObjects' Open State parameters were written to TSS 214, which could have occurred from the user loading the webpage or a user's previous interaction with the webpage resulting in CTSM 216 updating TSS 214 with one or more of the domObjects' Ready State parameters that are based on the user's interaction. After the user interaction, CTSM 216 updates TSS 214 with one or more of domObjects' Ready State parameters that are based on the user's interaction. Asynchronously, JavaScript 204 creates XML HTTP Request Object 206 and registers callback handler 208. XML HTTP Request Object 206 sends an asynchronous HTTP post request to server 210. Upon sending the HTTP request, JavaScript 204 returns control of the webpage to the user allowing the user to continue interacting with the webpage.

Server 210 receives the request and STSM 212 reads the domObjects' Ready State parameters and the domObjects' Open State parameters stored in TSS 214. Based on the read domObjects' Ready State parameters and domObjects' Open State parameters, STSM 212 performs appropriate server tasks based on the domObjects' Ready State parameters and domObjects' Open State parameters. Tasks typically include, but are not limited to, opening domObjects, grouping domObjects, refreshing domObjects, and setting domThemes and domOptions based on user selected domDesktop.

Server 210 then sends a response, preferably a single asynchronous HTTP response, to callback handler 208. Responses typically include partial or full page HTML being sent to the client. Server 210 also injects a JavaScript function into an updatepanel in the DOM. The EventTarget and EventArgument are read from the response in the JavaScript function. The EventArgument will determine which of the domObject Group(s) will be initialized. For example:
 dDOS.Taskbar.init( );
 dDOS.Menu.init( );
 dDOS.Shortcut.init( );
 dDOS.Window.init(_eTarget, _eArgument);
It is in these functions that the CTSM 216 will read and update the TSS after modifying the DOM.

As mentioned above, CTSM 216 reads the domObjects' Ready State parameters and domObjects' Open State parameters in TSS 214 and then performs appropriate client tasks based on the domObjects' Ready State parameters and domObjects' Open State parameters. Either just before or just after the DOM has been updated, CTSM 216 updates the domObjects' Open State parameters in the TSS 214 to mirror the new open state of the domObjects that exist in the DOM and updates the domObject Ready State parameters in the TSS. Finally, an operating system on the user's computer updates the DOM.

Application

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program PIN embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program PIN embodied on a computer readable medium may be transmitted using any appropriate medium, including but not limited to wireless, wire-line, optical fiber cable, radio frequency, etc., or any suitable combination of the foregoing. Computer program PIN for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

GLOSSARY OF CLAIM TERMS

Asynchronous Request: is a request that lets the client do other work while the request is being processed.

Client Transition State Manager (CTSM): is a client application programming interface (API) easing the work of programming the graphical user interface components. The CTSM is capable of reading and writing the DomObject Open State and DomObject Ready State to or from the Transition state store.

Document Object Model (DOM): is a cross-platform and language-independent convention for representing and interacting with objects in HTML, XHTML and XML documents.

DomObject Ready State: is the state of a domObjects when the domObject does not exist in the document object model.

DomObject: is any item capable of existing in the document object model that can be individually selected and manipulated, including but not limited to a desktop, shortcut, window, menu, taskbar, and context menu.

DomObjects' Open State: is the state of a domObjects when the domObject does exist in the document object model.

Object State: At a given instant in time, the condition of an object that determines the set of all sequences of actions in which the object can take part.

Server Transition State Manager (STSM): is a server application programming interface (API) easing the work of programming the graphical user interface components. The STSM is capable of reading and writing the domObjects' Open State parameters and the domObjects' Ready State parameters to or from the Transition State Store.

Transition State Store (TSS): is a data store capable of storing information on the domObjects' Ready State and domObjects' Open State and accessible by both the client-side and server-side of the client-server relationship.

What is claimed is:

1. A non-transitory, tangible computer-readable media having computer-executable instructions for performing a method by running a software program on a computer, the computer operating under an operating system, the method including issuing instructions from the software program to asynchronously communicate between a web browser and server and reducing multiple asynchronous requests and responses to a single asynchronous request and response while reducing the amount of data being transferred, the instructions comprising:

in response to a user interacting with a webpage via a web browser, updating a domObject's ready state parameters in a transition state store, by a client transition state manager,
    the transition state store being a data store,
    the transition state store accessible by both the server and web browser,
    the transition state store capable of storing a domObject's open state parameters and the domObject's ready state parameters,
    the user's interaction being a webpage request or an update to the domObject's ready state;
sending a single asynchronous request to a server resulting from the user's interaction with the webpage, by the web browser;
receiving the single asynchronous request, by the server;
reading the domObjects' ready state parameters and the domObjects' open state parameters in the transition state store, by a server transition state manager;
performing a set of appropriate tasks based on the read parameters of the domObjects' ready state and domObjects' open state and creates a response to the request, by the server transition state manager;
creating a single asynchronous response to the request, by the server;
sending the single asynchronous response to the web browser, by the server;
reading the domObjects' ready state parameters and the domObjects' open state parameters, in the transition state store, by the client transition state manager;
performing appropriate client tasks based on the domObjects' ready state parameters and domObjects' open state parameters that were read in the transition state store, by the client transition state manager;

updating the domObjects' ready states and domObjects' open states in the transition state store, by the client transition state manager; and updating the document object model.

2. One or more non-transitory tangible computer-readable media as in claim 1, further comprising:

the step of updating the domObjects' ready states and domObjects' open states in the transition state store further includes:

updating the domObjects' open state parameters in the transition state store with the domObjects' ready state parameters in the transition state store; and updating the domObjects' ready state parameters in the transition state store with the domObjects' ready state parameters occurring from a subsequent user interaction.

3. One or more non-transitory tangible computer-readable media as in claim 2, further comprising:

if the user has not performed a subsequent interaction at the time of initiating the step of updating the domObjects' ready state parameters in the transition state store with the domObjects' ready state parameters, the step may be replaced with a step including deleting the domObjects' Ready State parameters in the transition state store.

4. One or more non-transitory tangible computer-readable media as in claim 1, further comprising:

the transition state store being a cookie or a hidden field.

5. One or more non-transitory tangible computer-readable media as in claim 1, further comprising:

the transition state store being a data store on the client-side of a network and a data store on the server-side of a network such that the two data stores are capable of communicating.

6. One or more non-transitory tangible computer-readable media as in claim 1, further comprising:

the client transition state manager and the server transition state manager further include being a library or specification for a set of functions or routines, data structures, and variables.

7. One or more non-transitory tangible computer-readable media as in claim 1, further comprising:

the updating of the document object model further includes updating the appropriate properties, event handlers, and theme.

8. A computer-implemented method for asynchronously communicating between a web browser and server and reducing multiple asynchronous requests and responses to a single asynchronous request and response while reducing the amount of data being transferred, comprising the steps of:

in response to a user interacting with a webpage via a web browser, updating a domObject's ready state parameters in a transition state store, by a client transition state manager, the transition state store being a data store, the transition state store accessible by both the server and web browser, the transition state store capable of storing a domObject's open state parameters and the domObject's ready state parameters, the user's interaction being a webpage request or an update to the domObject's ready state;

sending a single asynchronous request to a server resulting from the user's interaction with the webpage, by the web browser;

receiving the single asynchronous request, by the server;

reading the domObjects' ready state parameters and the domObjects' open state parameters in the transition state store, by a server transition state manager;

performing a set of appropriate tasks based on the read parameters of the domObjects' ready state and domObjects' open state and creates a response to the request, by the server transition state manager;

creating a single asynchronous response to the request, by the server;

sending the single asynchronous response to the web browser, by the server;

reading the domObjects' ready state parameters and the domObjects' open state parameters, in the transition state store, by the client transition state manager;

performing appropriate client tasks based on the domObjects' ready state parameters and domObjects' open state parameters that were read in the transition state store, by the client transition state manager;

updating the domObjects' ready states and domObjects' open states in the transition state store, by the client transition state manager; and updating the document object model.

9. One or more non-transitory tangible computer-readable media as in claim 8, further comprising:

the step of updating the domObjects' ready states and domObjects' open states in the transition state store further includes:

updating the domObjects' open state parameters in the transition state store with the domObjects' ready state parameters in the transition state store; and updating the domObjects' ready state parameters in the transition state store with the domObjects' ready state parameters occurring from a subsequent user interaction.

10. One or more non-transitory tangible computer-readable media as in claim 9, further comprising:

if the user has not performed a subsequent interaction at the time of initiating the step of updating the domObjects' ready state parameters in the transition state store with the domObjects' ready state parameters, the step may be replaced with a step including deleting the domObjects' Ready State parameters in the transition state store.

11. One or more non-transitory tangible computer-readable media as in claim 8, further comprising:

the transition state store being a cookie or a hidden field.

12. One or more non-transitory tangible computer-readable media as in claim 8, further comprising:

the transition state store being a data store on the client-side of a network and a data store on the server-side of a network such that the two data stores are capable of communicating.

13. One or more non-transitory tangible computer-readable media as in claim 8, further comprising:

the client transition state manager and the server transition state manager further include being a library or specification for a set of functions or routines, data structures, and variables.

14. One or more non-transitory tangible computer-readable media as in claim 8, further comprising:

the updating of the document object model further includes updating the appropriate properties, event handlers, and theme.

15. A computer-based system for asynchronously communicating between a web browser and server and reducing multiple asynchronous requests and responses to a single asynchronous request and response while reducing the amount of data being transferred, comprising:

an electronic device operable to execute the following steps:

in response to a user interacting with a webpage via a web browser, updating a domObject's ready state parameters in a transition state store, by a client transition state manager,
   the transition state store being a data store,
   the transition state store accessible by both the server and web browser,
   the transition state store capable of storing a domObject's open state parameters and the domObject's ready state parameters,
   the user's interaction being a webpage request or an update to the domObject's ready state;
sending a single asynchronous request to a server based on the user's interaction with the webpage, wherein the request results in:
   receiving the single asynchronous request, by the server,
   reading the domObjects' ready state parameters and the domObjects' open state parameters in the transition state store, by a server transition state manager,
   performing a set of appropriate tasks based on the read parameters of the domObjects' ready state and domObjects' open state and creates a response to the request, by the server transition state manager,
   creating a single asynchronous response to the request, by the server,
   sending the single asynchronous response to the web browser, by the server;
reading the domObjects' ready state parameters and the domObjects' open state parameters, in the transition state store, by the client transition state manager;
performing appropriate client tasks based on the domObjects' ready state parameters and domObjects' open state parameters that were read in the transition state store, by the client transition state manager;
updating the domObjects' ready states and domObjects' open states in the transition state store, by the client transition state manager; and
updating the document object model.

16. The computer-based system as in claim 15, further comprising:
   the step of updating the domObjects' ready states and domObjects' open states in the transition state store further includes:
   updating the domObjects' open state parameters in the transition state store with the domObjects' ready state parameters in the transition state store; and
   updating the domObjects' ready state parameters in the transition state store with the domObjects' ready state parameters occurring from a subsequent user interaction.

17. The computer-based system as in claim 16, further comprising:
   if the user has not performed a subsequent interaction at the time of initiating the step of updating the domObjects' ready state parameters in the transition state store with the domObjects' ready state parameters, the step may be replaced with a step including deleting the domObjects' Ready State parameters in the transition state store.

18. The computer-based system as in claim 15, further comprising:
   the transition state store being a cookie or a hidden field.

19. The computer-based system as in claim 15, further comprising:
   the transition state store being a data store on the client-side of a network and a data store on the server-side of a network such that the two data stores are capable of communicating.

20. The computer-based system as in claim 15, further comprising:
   the client transition state manager and the server transition state manager being a library or specification for a set of functions or routines, data structures, and variables.

* * * * *